US011931771B2

(12) United States Patent
Barberan Latorre

(10) Patent No.: US 11,931,771 B2
(45) Date of Patent: Mar. 19, 2024

(54) SYSTEM FOR APPLYING A PRODUCT BY ROLLER

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 171 days.

(21) Appl. No.: 17/147,098

(22) Filed: Jan. 12, 2021

(65) Prior Publication Data

US 2021/0213483 A1 Jul. 15, 2021

(30) Foreign Application Priority Data

Jan. 14, 2020 (EP) .................................... 20382015

(51) Int. Cl.

*B05D 1/28* (2006.01)
*B05C 1/08* (2006.01)
*B05C 11/10* (2006.01)
*B05C 11/11* (2006.01)

(52) U.S. Cl.

CPC .............. *B05D 1/28* (2013.01); *B05C 1/0813* (2013.01); *B05C 1/0817* (2013.01); *B05C 1/0821* (2013.01); *B05C 1/0865* (2013.01); *B05C 11/10* (2013.01); *B05C 11/1039* (2013.01); *B05C 11/11* (2013.01)

(58) Field of Classification Search

None

See application file for complete search history.

(56) References Cited

U.S. PATENT DOCUMENTS 2,888,902 A 6/1959 Well et al.
2,981,226 A * 4/1961 Murray ................. B05C 1/0865 118/259
3,419,418 A * 12/1968 Gamble ................. B21D 51/44 427/295
3,919,971 A * 11/1975 Lubeck ................. B05C 1/0865 118/259
4,055,688 A * 10/1977 Caratsch .............. D06N 7/0092 427/195
4,060,648 A * 11/1977 Taylor-Brown ......... B05D 7/04 427/482
4,241,111 A * 12/1980 Hamamura ........... B05C 1/0826 427/211

(Continued)

FOREIGN PATENT DOCUMENTS

GB 1515158 A 6/1978

OTHER PUBLICATIONS

European Search Opinion for Corresponding European Application No. EP 20382015. (Year: 2020).*

(Continued)

*Primary Examiner* — Jethro M. Pence

(74) *Attorney, Agent, or Firm* — LUCAS & MERCANTI, LLP

(57) ABSTRACT

A system for applying a product (3) by roller is disclosed. The system has an applicator roller (1) for applying a product (3) on a substrate (4) and a first dosing roller (2') for dosing said product (3) on the surface of the applicator roller (1), wherein the system comprises at least one second dosing roller (2") configured to fine-tune the dosing performed by the first dosing roller (2'), thereby adjusting the amount of product (3) dosed on the surface of the applicator roller (1).

11 Claims, 6 Drawing Sheets

(56) References Cited

U.S. PATENT DOCUMENTS 4,363,288 A * 12/1982 Fara ...................... B05C 1/0834 118/210
4,463,467 A * 8/1984 Gruber ............... D06B 19/0094 427/244
4,538,541 A * 9/1985 Zimmer ................ B05C 11/025 118/259
4,741,929 A * 5/1988 Kossuth .................. B05C 1/165 118/223
4,743,330 A * 5/1988 Tillotson .............. D06N 7/0076 428/95
4,848,269 A * 7/1989 Zimmer .................. B41F 31/06 118/212
4,871,593 A * 10/1989 McIntyre ................. B05D 1/28 118/259
5,288,524 A * 2/1994 Kramer ................... B05C 1/022 118/233
5,306,523 A * 4/1994 Shibata .................... G03C 1/74 427/322
5,328,735 A * 7/1994 Okazaki ............. G03G 15/2057 118/232
5,407,702 A * 4/1995 Smith ...................... B05D 1/28 427/209
5,503,674 A * 4/1996 Hofmann ................ B41F 23/08 118/118
5,670,211 A * 9/1997 Huber ...................... B05D 1/36 427/244
5,814,369 A * 9/1998 Bockh ...................... B05D 1/28 118/308
6,217,946 B1 * 4/2001 Bolind .................. B05C 1/0813 427/393.6
6,358,318 B1 * 3/2002 Gherardi ............... B05C 1/0865 156/578
6,455,152 B1 * 9/2002 DiZio ................... B05C 1/0813 428/355 R
6,472,028 B1 * 10/2002 Frazzitta ................... B41F 7/32 427/504
6,511,711 B2 * 1/2003 Quiel ....................... G03C 1/74 427/470
6,562,407 B1 * 5/2003 Bonnebat ................. B05D 1/28 427/457
6,579,574 B2 * 6/2003 Seaver .................. B05B 5/0255 427/466
6,592,701 B1 * 7/2003 Bonnebat .............. B05C 1/0834 427/428.15
6,627,262 B1 * 9/2003 Soas ........................ B05D 1/28 118/259
6,676,754 B1 * 1/2004 Fleming ................. C08G 18/08 118/325
6,780,470 B2 * 8/2004 Ishizuka ................... B05C 3/18 427/361
6,827,783 B2 * 12/2004 Okeshi .................. B05C 1/0865 118/103
6,878,413 B2 * 4/2005 Frazzitta ................... B41F 7/32 427/493
7,104,216 B2 * 9/2006 Suzuki ...................... B05C 1/10 118/259
7,204,883 B2 * 4/2007 Rizzoli .................. A24C 5/472 118/202
7,670,447 B2 * 3/2010 Minamida ............. B05C 1/0834 156/60
7,838,722 B2 * 11/2010 Blessing ............... B05C 1/0804 604/374
7,976,656 B2 * 7/2011 Sartoni ................. B05C 1/0834 427/427.2
8,281,737 B2 * 10/2012 Austin .................... A61L 31/14 118/249
8,435,373 B2 * 5/2013 Slafer ...................... B05D 1/28 156/219
8,720,370 B2 * 5/2014 Rebstock ............ H01L 31/1828 118/244
8,735,645 B2 * 5/2014 Blessing ........... A61F 13/15658 604/374
8,739,727 B2 * 6/2014 Austin ..................... B05D 1/28 118/212
8,739,728 B2 * 6/2014 Rebstock .............. B05C 1/0808 118/200
8,795,785 B2 * 8/2014 Rebstock ............ C23C 18/1287 427/428.1
8,980,374 B2 * 3/2015 Nakagame ............ C23C 16/545 427/294
8,993,069 B2 * 3/2015 Hullmann .................. C09J 7/22 427/428.1
9,016,232 B2 * 4/2015 Jones ...................... B05C 1/083 118/259
9,028,908 B1 * 5/2015 DeTar .................... H01B 13/16 427/119
9,034,437 B1 * 5/2015 Randazzo ............. B31F 1/2818 427/428.14
9,061,315 B1 * 6/2015 Griglak ............... B05C 17/0242
10,338,283 B2 * 7/2019 Wang ..................... C09J 133/00
10,409,054 B2 * 9/2019 Schram ..................... B05C 1/08
10,583,455 B2 * 3/2020 Landa ................... B41F 19/001
10,751,750 B2 * 8/2020 Landa ....................... B05D 3/12
10,871,665 B2 * 12/2020 Tian ......................... B05D 1/28
10,906,064 B2 * 2/2021 Landa ................... B05B 7/1481
10,919,070 B2 * 2/2021 Saito ....................... B05C 11/10
10,960,432 B2 * 3/2021 Landa ....................... B44F 9/10
10,981,191 B2 * 4/2021 Landa ...................... B41M 5/00
11,155,427 B2 * 10/2021 Triepel .................. B41F 19/062
11,185,451 B2 * 11/2021 Blessing ............... A61F 13/535
11,267,014 B2 * 3/2022 Zahlen .................. B05C 1/0821
11,331,691 B2 * 5/2022 Chung .................. B29B 15/122
2002/0102355 A1 * 8/2002 Levendusky ............ B05D 7/14 427/209
2002/0122893 A1 * 9/2002 Tramont .................. B05D 1/40 427/428.05
2003/0113466 A1 * 6/2003 Frazzitta ............. B41M 7/0054 427/428.15
2004/0096585 A1 * 5/2004 Bonnebat ................ B05C 1/083 118/244
2004/0202758 A1 * 10/2004 Tromp .................. B05C 1/0865 426/446
2004/0241328 A1 12/2004 Bradatsch et al.
2007/0209587 A1 * 9/2007 Kiener .................. B05C 11/044 118/712
2009/0232998 A1 * 9/2009 Krebs ................... B05C 1/0813 427/428.2
2010/0154705 A1 * 6/2010 Pacetti ...................... B05C 1/08 118/232
2011/0195193 A1 * 8/2011 Oster .................... B05C 1/0834 118/200
2012/0034386 A1 * 2/2012 Oh ........................... B05C 1/08 118/103
2013/0008373 A1 1/2013 Rousu
2014/0141233 A1 * 5/2014 Crawford ................. C08K 5/01 5/636
2014/0259498 A1 * 9/2014 Rebstock .................. B05C 1/10 15/230
2014/0261164 A1 * 9/2014 Rebstock ............ H01L 31/1828 118/69
2014/0287196 A1 * 9/2014 Van Berlo ................. B32B 7/12 428/182
2014/0295092 A1 * 10/2014 Rebstock ............ H01L 31/1828 427/428.2
2014/0356546 A1 * 12/2014 Rebstock ................ C23C 18/02 427/428.01
2015/0174601 A1 * 6/2015 Lin .......................... B05D 3/12 427/369
2019/0099775 A1 * 4/2019 Sakamoto ............... B41F 17/00
2020/0139399 A1 * 5/2020 Sekiya .................... D21F 1/325
2020/0346245 A1 * 11/2020 Landa .................... B41J 2/0057
2021/0086224 A1 * 3/2021 Landa ...................... B05D 1/12
2021/0156064 A1 * 5/2021 Nam ..................... D06P 1/0036
2021/0178422 A1 * 6/2021 Landa .................... B05D 3/048
2021/0213483 A1 * 7/2021 Barberan Latorre ........................ B05C 11/1039
2021/0213484 A1 * 7/2021 Barberan Latorre ... B05C 1/025
2021/0276036 A1 * 9/2021 Svec ......................... E04D 1/34
2021/0308711 A1 * 10/2021 Volmering .......... B05C 11/1039

(56) References Cited

U.S. PATENT DOCUMENTS

| | | | | |
|---|---|---|---|---|
| 2022/0081838 | A1* | 3/2022 | Tsai | D21H 23/56 |
| 2022/0161543 | A1* | 5/2022 | Humberstone | B41F 9/10 |
| 2022/0196349 | A1* | 6/2022 | Biglari | F28F 13/18 |
| 2022/0212224 | A1* | 7/2022 | Lutz | B05C 1/0817 |

OTHER PUBLICATIONS

European Search Report for Corresponding European Application No. EP 20382015 (2 Pages) (dated Aug. 18, 2020).

* cited by examiner

SYSTEM FOR APPLYING A PRODUCT BY ROLLER

CROSS REFERENCE TO RELATED APPLICATION

This application claims the benefit of priority from European Patent Application No. 20382015.4 filed on Jan. 14, 2020, which is incorporated herein by reference.

TECHNICAL FIELD

The object of the present invention is a system for applying a product by roller, which enables a homogeneous application of a product (such as a varnish) on a substrate (such as a sheet of cardboard), achieving a homogeneous finish and enabling the product to be optimally used, minimising the losses of said product.

The system for applying a product by roller object of the present invention has a special application in the sector of logistics engineering and manufacture of packaging, signs and posters, as well as manufacturing furniture or similar.

STATE OF THE ART

Systems for applying a product, like a varnish, by roller usually consist of a set of two rollers: on one side, an applicator roller for applying the product on the substrate, the surface of which is coated in rubber, and; on the other side, a dosing roller, with a surface typically made of chromed metal, located in the vicinity of the applicator roller, which is used to dose the amount of product with which the applicator roller is "slathered", for the subsequent application thereof on the substrate (a sheet, plate, panel, poster, layer, etc.).

Both rollers, applicator and dosing, have an independent motor for the rotation thereof, and also have independent speed regulation.

The product is applied on the substrate as the substrate advances with respect to the stationary application system by means of a substrate transport system. The substrate transport system can be, for example, a conveyor belt or rollers.

The basic operating principle of these systems for applying a product consists of dosing a product on the applicator roller. This product is supplied by pumping between both rollers, and the dosing is achieved by adjusting the space or gap between both rollers, as well as adjusting the angular speed of both rollers and the rotation direction thereof.

Thus, for a certain production speed (output speed of the substrates coated by the product), wherein said production speed forces a certain speed of the applicator roller:

- if the gap between both rollers increases, the amount of product dosed increases;
- if the angular speed of the dosing roller increases, in the rotation direction inverse to the angular speed of the application roller, the amount of product dosed also increases, and;
- if the speed of the dosing roller increases in the same rotation direction as the application roller, the amount dosed decreases.

By dosing the product on the application roller (or applicator roller), the grammage of the product applied on the substrate can be regulated.

In conventional systems for applying a product by roller, a portion of the product (i.e. varnish) not consumed in the application is returned to the pumping tank by gravity, through funnels, channels and trays for recirculation.

During the stay of the product in the recirculation circuit, some of the solvents may evaporate, since it is an open circuit for the most part, especially when using water-based products. This evaporation generates a variability in certain properties of the product, such as the viscosity, density, etc. The elements of this recirculation circuit, funnels, channels, trays must be cleaned after each use, wherein this cleaning task is more or less difficult depending on the product used in the application.

There are certain dosing limitations by means of this application system for certain production speeds, or for certain viscosities of the product to be applied. For example, for substrate production speeds on the order of 120 m/m in, applying product to achieve a low grammage is a complicated task when the viscosity of the product is high (currently speeds on the order of 80-90 m/min are considered high speeds for the handled grammages applied to printing on cardboard). This is the main problem that must be faced in some applications, namely, achieving the dosing of a low amount of product (low grammage), with a high production speed:

The higher the rotation speed of the applicator roller (n1), and the higher the viscosity of the product, for a certain gap between the applicator roller and the dosing roller, with the angular speed of the dosing roller fixed, the higher the amount dosed between the two rollers.

What is usually done to reduce this dosed amount, for high production speeds, is to rotate the dosing roller at high speeds (n2), in a linear counter direction of the rotation of the applicator roller in the dosing area between the dosing roller and the applicator roller (i.e., with angular speed in the same direction as the applicator roller) and lower the viscosity of the product.

The viscosity can be lowered to a certain limit, after which it would no longer be valid.

The speed of the dosing roller (n2) can be increased to limits marked by:

- the very mechanics of the roller system;
- the shear produced in the area between the two rollers, wherein the greater it is, the more turbulence it generates in the product and the greater the destabilisation thereof, foaming it, increasing the viscosity, etc.;
- the low tolerance to the possible failure of a mechanism. For example, if the system runs out of product, then with this high shear, the rubber of the applicator roller will likely fail.

A clear and common example of the adverse effect produced by the high shear is that the product is foamed and, therefore, the viscosity thereof is increased. When the viscosity increases, maintaining the pumping conditions, it reaches a point when the pump is not able to supply the product to the rollers. At some point, these remain dry, and with so much shear, the rubberised roller breaks down.

Currently, it is not possible to obtain thicknesses corresponding to grammages of 5 to 12 gr/m2 for production speeds greater than 90 m/minute and for primer or anchoring products conventionally applied for printing on cardboard. These primer or anchoring products are usually water-based acrylic dispersions, or they are solvent-based for curing by means of photoinitiators activated by ultraviolet radiation.

Logically, a grammage that is as low as possible is of interest in order to reduce the cost due to the amount of product used, reduce the drying time, as well as prevent problems derived from the varnish being introduced on the substrate (it is of interest that the varnish stays in a superficial layer coating the substrate, and that it does not permeate into internal layers of the substrate).

DESCRIPTION OF THE INVENTION

In order to solve the aforementioned drawbacks, the present invention relates to a system for applying a product by roller.

The system for applying a product by roller comprises an applicator roller for applying a product on a substrate, as well as a first dosing roller for dosing said product on the surface of the applicator roller.

In a novel manner, the system for applying a product by roller, object of the present invention, comprises at least one second dosing roller configured to fine-tune the dosing performed by the first dosing roller, thereby adjusting the amount of product dosed on the surface of the applicator roller.

In this manner, by means of the first dosing roller, an initial amount of product is dosed on the surface of the applicator roller, and by means of the at least one second dosing roller, the amount of product initially dosed is adjusted, being able to reduce or maintain the layer of product (for example, a varnish) dosed on the surface of the applicator roller.

This regulation and fine-tuning of the dosing of product on the applicator roller results in a better regulation of the grammage of product applied on the substrate.

Preferably, the system for applying a product by roller of the present invention comprises a movement subsystem, which enables the first dosing roller and/or the second dosing roller to move closer to and/or farther away from the applicator roller.

This moving closer and/or farther away can be performed individually on each dosing roller, or jointly for the two dosing rollers, which would jointly move closer to or farther away from the applicator roller.

When a dosing roller moves closer to the applicator roller, it has the effect of decreasing the amount of product dosed on the surface of the applicator roller. Moreover, when a dosing roller moves away from the applicator roller (up to a certain distance), it has the effect of increasing the amount of product dosed on the surface of the applicator roller.

According to a preferred embodiment of the present invention, each dosing roller comprises a motor independent from the motors of any other dosing roller and independent from the motor of the applicator roller.

Likewise, preferably, the system for applying a product by roller object of the present invention comprises a regulation subsystem for the direction and the rotation speed of the first dosing roller and of the at least one second dosing roller.

The independent motor and the regulation subsystem mentioned in the previous paragraph enable both the rotation direction thereof (the sign of the angular speed thereof) and the magnitude of the rotation speed thereof (the absolute value of the angular speed thereof) to be regulated, in an independent manner for each dosing roller.

When the rotation direction of a dosing roller is opposite from the rotation direction of the applicator roller, the dosing of product on the surface of the applicator roller is favoured. Under these circumstances, when the magnitude of the rotation speed of the dosing roller increases, for a fixed rotation speed of the applicator roller, the amount of product dosed on the surface of the applicator roller increases.

It is therefore possible to act on the magnitude of the rotation speed of each dosing roller, and even invert the rotation direction of said dosing roller.

When the rotation direction of a dosing roller coincides with the rotation direction of the applicator roller, the dosing of product on the surface of the applicator roller is hindered, even being able to favour the removal of product from the surface of the applicator roller. Under these circumstances, this effect is enhanced when the magnitude of the rotation speed of the dosing roller increases.

According to a possible embodiment of the invention, the system for applying a product by roller comprises at least one dosing body. This at least one dosing body comprises the first dosing roller and/or the at least one second dosing roller. In other words, there can be a dosing body with a single dosing roller, or a dosing body with several dosing rollers.

The at least one dosing body can comprise one or more side walls.

Preferably, the at least one dosing body defines, together with the applicator roller, a first product collection chamber. This first product collection chamber can be defined between the applicator roller and the first dosing roller and, optionally also the side walls of the at least one dosing body. This first product collection chamber can also be additionally defined by sealing plates on the sides of said first product collection chamber.

The product collection chamber favours a bath being produced on the surface of the applicator roller in the product stored in said product collection chamber, thereby favouring the fastening of product on the surface of the applicator roller. After this bath, the corresponding dosing roller doses (by regulating the rotation speed and the distance thereof from the applicator roller) the suitable amount of product on the surface of the applicator roller.

Likewise, this first product collection chamber enables a product residue to be collected which is fastened to the surface of the applicator roller and which has not been applied to any substrate due to having been located on the sides of the roller which stay outside of the passage of the substrates on the conveyor belt or transport system, or due to staying in an area corresponding to an intermediate space between substrates on the conveyor belt or transport system. This product residue which returns stuck to the surface of the applicator roller is received and mixed with the product stored in the first product collection chamber.

According to a possible embodiment of the invention, the at least one dosing body defines, together with the applicator roller, at least one second product collection chamber. This second product collection chamber can be defined between the applicator roller and the at least one second dosing roller and, optionally, also the side walls of the at least one dosing body. This second product collection chamber can also be additionally defined by sealing plates on the sides of said second product collection chamber.

Preferably, the system according to the invention comprises a product recirculation circuit, configured to recirculate the product from the first product collection chamber and/or from the at least one second product collection chamber. Thus, this prevents the product from drying out or becoming compressed in the chambers, being able to perform a continuous supply of product to the application system.

It is envisaged that the recirculation circuit is connected to the first product collection chamber and/or to the at least one second product collection chamber in order to extract and/or introduce the product into said collection chambers. This favours the fact that the product, which at a given time can be stored in excess inside the product collection chambers, can recirculate and return to the applicator roller and/or to the product collection chambers.

More preferably, the product recirculation circuit is configured to recirculate the product from a product supply tank, together with the product from the first product collection chamber and/or from the at least one second product collection chamber. In this manner, this facilitates the fact that the product recirculated and accumulated in the collection chambers is kept fresh at all times during the use of the application system.

It is envisaged that a product supply tank is connected to the recirculation circuit in order to extract and/or introduce the product into said tank. In this manner, the very recirculation circuit serves as the supply circuit for the product in the application system.

In an alternative or complementary manner, the product can be supplied directly between the dosing roller and the applicator roller, in the first product collection chamber or in the at least one second product collection chamber.

The recirculation or supply of product can be performed by means of pumping. The pumping is configured to lead the pumped product towards the applicator roller and/or towards the first product collection chamber and/or towards the at least one second product collection chamber. It is also envisaged that the recirculation or supply can be performed, for example, at least in part by gravity.

It is envisaged that the system include a pump connected to a pumping circuit, wherein said pumping circuit is configured to lead the pumped product back towards the applicator roller and/or towards the first product collection chamber and/or towards the second product collection chamber.

Preferably, the system for applying a product by roller object of the present invention comprises product level maintenance means in the first product collection chamber and/or in the at least one second product collection chamber, in order to maintain a constant level of product due to the extraction or introduction of product into said chambers.

The product level maintenance means can take the form of, for example, an overflow arranged in a side wall of the corresponding collection chamber. The overflow can comprise an opening at a certain level, such that, when the product of the collection chamber exceeds said level, the product overflows through the opening.

In an alternative or complementary manner, the product level maintenance means can comprise: at least one product (3) level sensor arranged in the first product (3) collection chamber (9') and/or in the at least one second product (3) collection chamber (9"), and at least one valve arranged in the connection of the first product (3) collection chamber (9') with the recirculation circuit and/or in the connection of the at least one second product (3) collection chamber (9") with the recirculation circuit; such that when the at least one product (3) level sensor detects that the product (3) level in the first chamber (9') and/or in the at least one second product (3) collection chamber (9") exceeds a predetermined value, said level sensor sends an opening signal to the at least one valve, and when the at least one level sensor detects that the product (3) level in the first chamber (9') and/or in the at least one second product (3) collection chamber (9") falls below a certain value, the at least one level sensor sends a closing signal to the at least one valve.

Preferably, the first product collection chamber comprises an opening defined by at least one side wall of the dosing body and by the applicator roller. Said opening has a width such as to enable (as already anticipated) the passage towards the first product collection chamber of a layer of product that has not been deposited on the substrate and which returns adhered to the applicator roller.

According to a possible embodiment of the invention, the at least one dosing body comprises a product collection tray located underneath the first product collection chamber and/or underneath the at least one second product collection chamber. This product collection tray defines, together with the applicator roller and/or together with at least one side wall of the dosing body, a product accumulation compartment.

This product accumulation compartment enables an accumulation of product dragged by the first dosing roller and/or by the second dosing roller and/or detached from the applicator roller. The area of the dosing body located in correspondence with the bottom of the product collection tray can comprise a drain for removing product towards a waste duct or towards the recirculation circuit.

The product collection tray facilitates the cleaning of the application system by means of a cleaning product supplied to the application system instead of the application product. For cleaning, the cleaning product crosses through the first dosing roller and/or the second dosing roller, dragging the excess application product along with the cleaning product to the accumulation compartment, wherein the products accumulate and from where they can be removed by means of a drain.

According to a possible embodiment, the system for applying a product by roller object of the present invention comprises at least one retainer configured to retain and/or scrape product dragged by the first dosing roller and/or by the second dosing roller.

The retention enables the passage of product outside of the product collection chambers to be prevented or reduced, such that portions of the system such as bearings or the motor stay isolated from the product.

For the scraping, the retainer can take the shape of a blade. The scraping enables the removal of excess product dragged by the dosing roller, adhered thereto. For the perfect operation of the system, the dosing roller must be applied on the surface of the applicator roller, the surface of the dosing roller being free of product.

In this manner, the surface of the dosing rollers is cleaned of excess product adhered to the surface thereof, said product being recovered so that it stays inside a product collection chamber, in the product collection tray, or in a specific product collection module.

Preferably, the accumulation compartment has an outlet which is directed towards a product recirculation circuit.

Advantageously, the product collection encourages product to be saved, collecting the excess product adhered to the surface of the second dosing roller and leading it to the recirculation circuit.

The present invention also relates to a method for applying a product by roller. This method comprises using the system for applying a product by roller as described above.

The method for applying a product by roller object of the present invention comprises moving the first dosing roller and/or the at least one second dosing roller closer to or farther away from the applicator roller, in order to reduce and/or increase, respectively, the amount of product to be dosed on the surface of the applicator roller.

According to a possible embodiment, the method for applying a product by roller comprises setting an angular speed for the first dosing roller and/or for the at least one second dosing roller, such that if the angular speed of the dosing roller has a direction inverse to the angular speed of the applicator roller, the amount of product dosed on the surface of the applicator roller increases, and; If the angular speed of the dosing roller has the same direction as the angular speed of the applicator roller, the amount of product dosed on the surface of the applicator roller decreases.

The system and method described enable a very wide range of product grammages to be dosed on the substrate, even at high speeds. Furthermore, since the product collection chamber(s) is/are almost closed and the recirculation is performed by means of pipes, the evaporation, and therefore the viscosity, are able to be controlled much better, in addition to being a much cleaner system than the conventional ones as far as splashing and the very cleaning thereof.

BRIEF DESCRIPTION OF THE FIGURES

The following figures have been included as part of the description of at least one embodiment of the invention.

DETAILED DESCRIPTION

The present invention relates, as mentioned above, to a system for applying a product (3) by roller.

Figure 1:
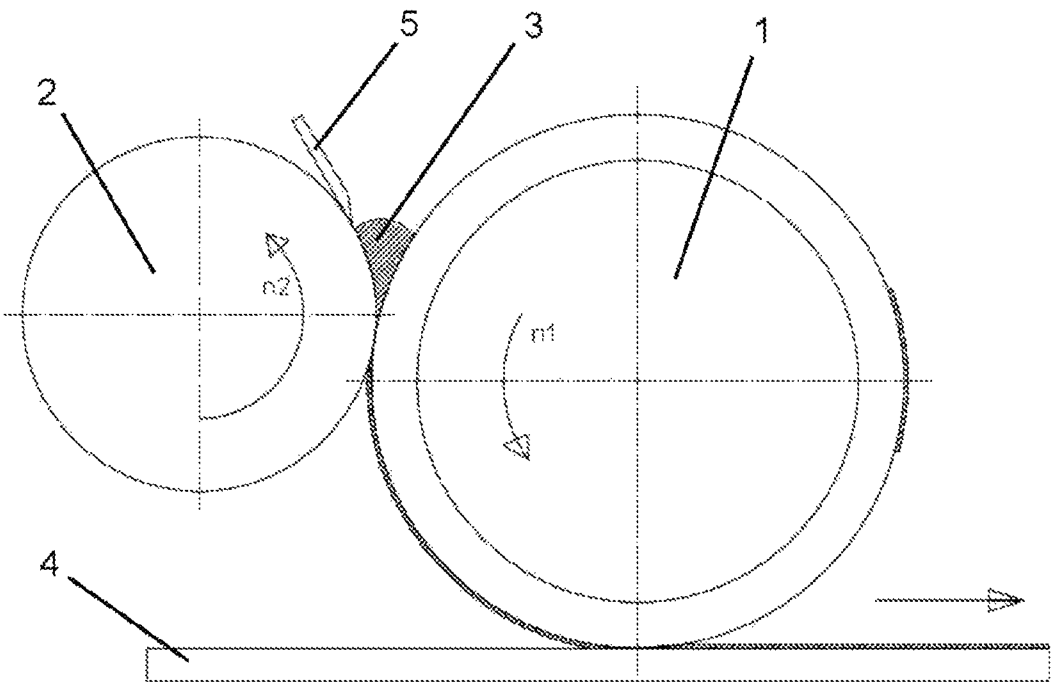
FIG. 1 shows a schematic representation of a conventional system for applying a product by roller.

FIG. 1 shows a system for applying a product (3) by roller corresponding to the state of the art. An applicator roller (1) for applying a product (3) on a substrate (4) can be seen. A dosing roller (2) is also seen, for dosing or applying product (3) on the applicator roller (1). The figure shows a blade (5) which provides a scraping of the dosing roller (2) when it rotates in the counterclockwise direction during the operation thereof and a retention of the product (3), making said product (3) once again available for dosing or returning it to a recirculation circuit (not shown in the figures).

The system for applying a product (3) by roller object of the present invention comprises (like in conventional systems) an applicator roller (1) for applying a product (3) on a substrate (4) and a first dosing roller (2').

Said applicator roller (1) preferably comprises a rubber surface (8).

According to the present invention, the system for applying a product (3) by roller comprises at least one second dosing roller (2"). By means of the first dosing roller (2') an initial (or thick) dosage of product (3) is achieved on the applicator roller (1). By means of the second dosing roller (2"), the dosing of product (3) on the applicator roller (1) is able to be fine-tuned, adjusting the amount and/or thickness of the layer of product (3) dosed on the applicator roller (1) to a predefined value.

Each dosing roller (2', 2") preferably comprises a metal surface, typically made of chromed steel.

Said at least two dosing rollers (2', 2") can make up part of a single dosing body (6), or can be independent dosing bodies (6).

Optionally, each dosing body (6) can comprise one or more side walls (7).

Each dosing body (6) can define, together with the applicator roller (1), at least one product (3) collection chamber (9'), (9"). Said at least one product (3) collection chamber (9'), (9") is used for collecting and recirculating said product (3) towards a pump, for pumping and new dosing on the applicator roller (1) and/or the collection chamber(s) (9'), (9").

Figure 2:
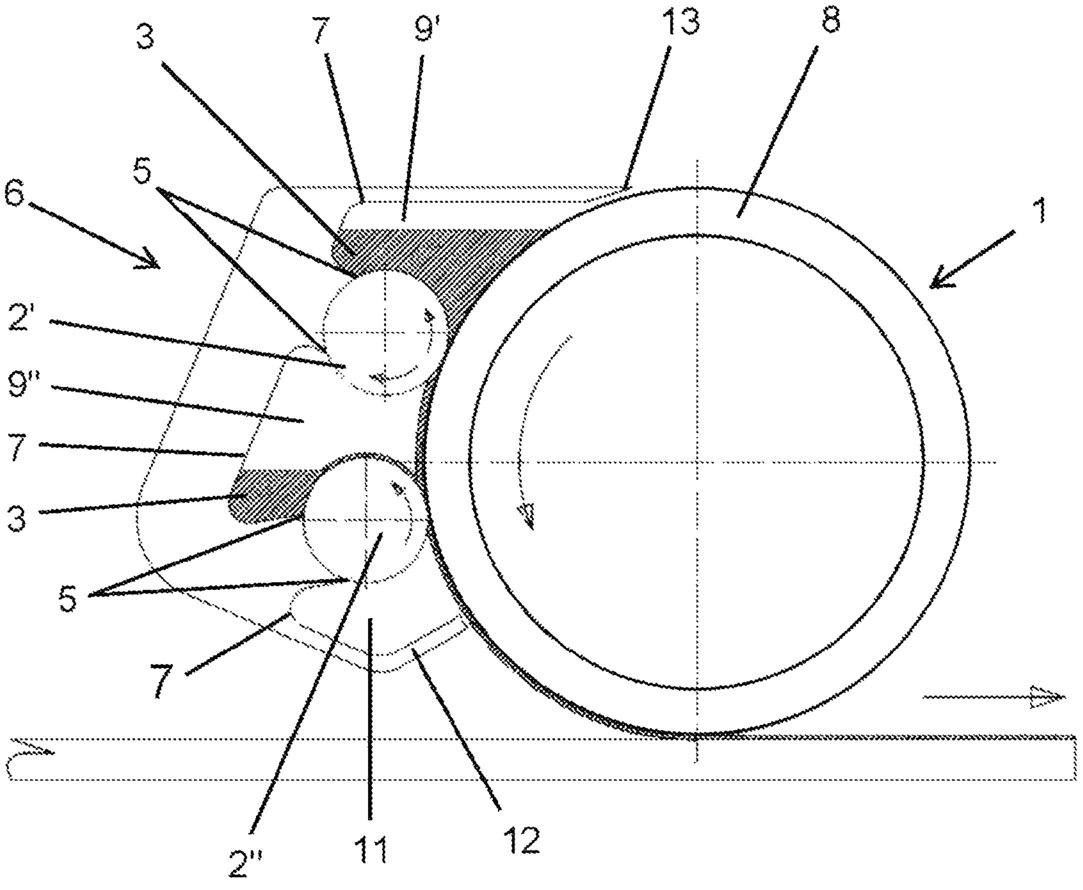
FIG. 2 shows a schematic representation of a first embodiment of the present invention, wherein the system for applying a product by roller comprises a dosing body with a first product collection chamber, a first dosing roller, a second product collection chamber, a second dosing roller and a product collection tray.

According to a first embodiment of the present invention, shown in FIG. 2, there is a single dosing body (6) comprising a first dosing roller (2') and a second dosing roller (2"). In this embodiment, the dosing body (6) comprises several side walls (7). The dosing body (6) defines, together with the applicator roller (1), a first product (3) collection chamber (9') and a second product collection chamber (9"), for receiving product (3) coming from the pump and for recirculating said product (3) towards the pump, for new circulation towards the product (3) collection chambers (9', 9"). More specifically, in this first embodiment, the first product (3) collection chamber (9') is defined by the first dosing roller (2'), at least one side wall (7) of the dosing body (6) and the applicator roller (1); the second product (3) collection chamber (9") is defined by the second dosing roller (2"), at least one side wall (7) of the dosing body (6), the first dosing roller (2') and the applicator roller (1).

According to the embodiment shown in FIG. 2, a retainer (5) is arranged in a joint area between the dosing roller (2', 2") and the dosing body (6), both in the upper portion and in the lower portion of the dosing roller (2', 2"), providing the function of retaining and/or scraping product (3) adhered to the dosing rollers (2', 2").

Figure 3:
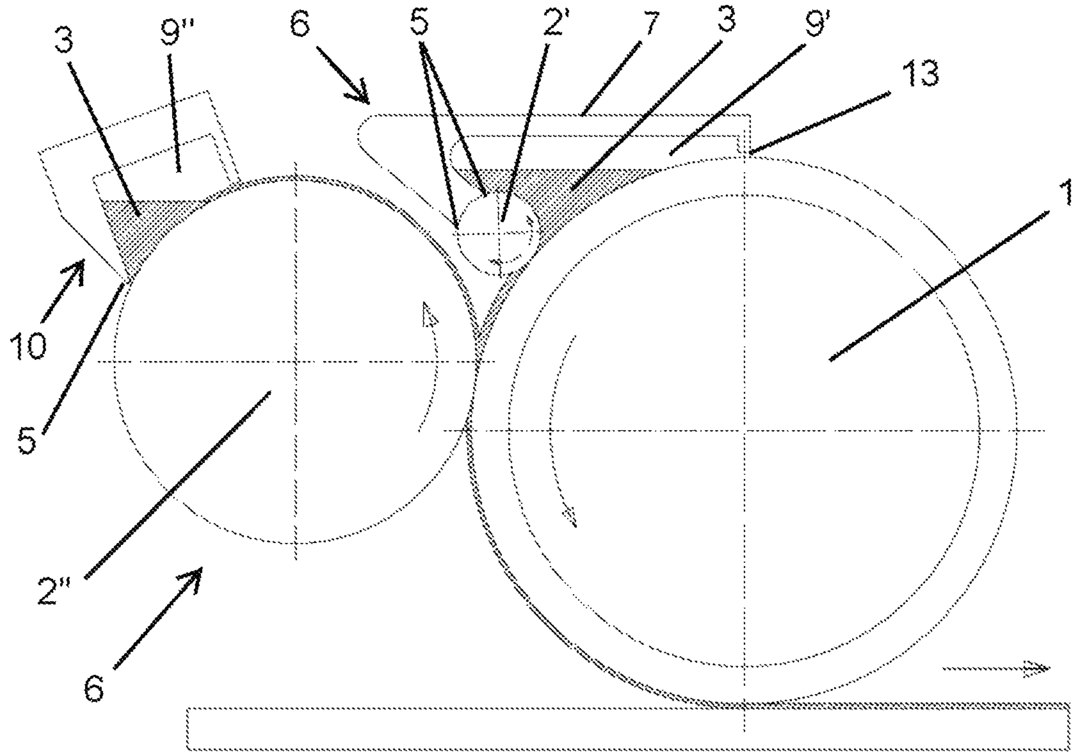
FIG. 3 shows a schematic representation of a second embodiment of the present invention, wherein the system for applying a product by roller comprises two product collection chambers, a first dosing roller and a second dosing roller.

FIG. 3 shows a second embodiment of the system for applying a product (3) by roller, object of the present invention, wherein a first dosing body (6) comprises a first dosing roller (2') and at least one side wall (7). Said first dosing body (6) defines, together with the applicator roller (1), a first product (3) collection chamber (9'). The product (3) dosed by the first dosing roller (2') from the first product (3) collection chamber (9') is directed, by the surface of the applicator roller (1), towards the second dosing roller (2") (which forms, by itself, a second dosing body (6)). In this embodiment, the system for applying a product (3) by roller comprises a collection module (10) equipped with retainers (5); said product collection module (10) defines, together with the second dosing roller (2"), a second product (3) collection chamber (9"), for accumulating excess product (3) from the dosage, dragged by the second dosing roller (2"). The second product collection chamber (9") has an outlet which is directed towards the recirculation circuit. As seen, the embodiment shown in FIG. 3 differs from the embodiment shown in FIG. 2 in the arrangement of the second product collection chamber (9").

According to the embodiment shown in FIG. 3, a retainer (5) is arranged in a joint area between the dosing roller (2') and the dosing body (6), both in an upper area and in a lower area, providing the function of retaining and/or scraping product (3) adhered to the dosing roller (2'). Likewise, the collection module (10) incorporates a retainer (5) in the lower portion thereof.

Figure 4:
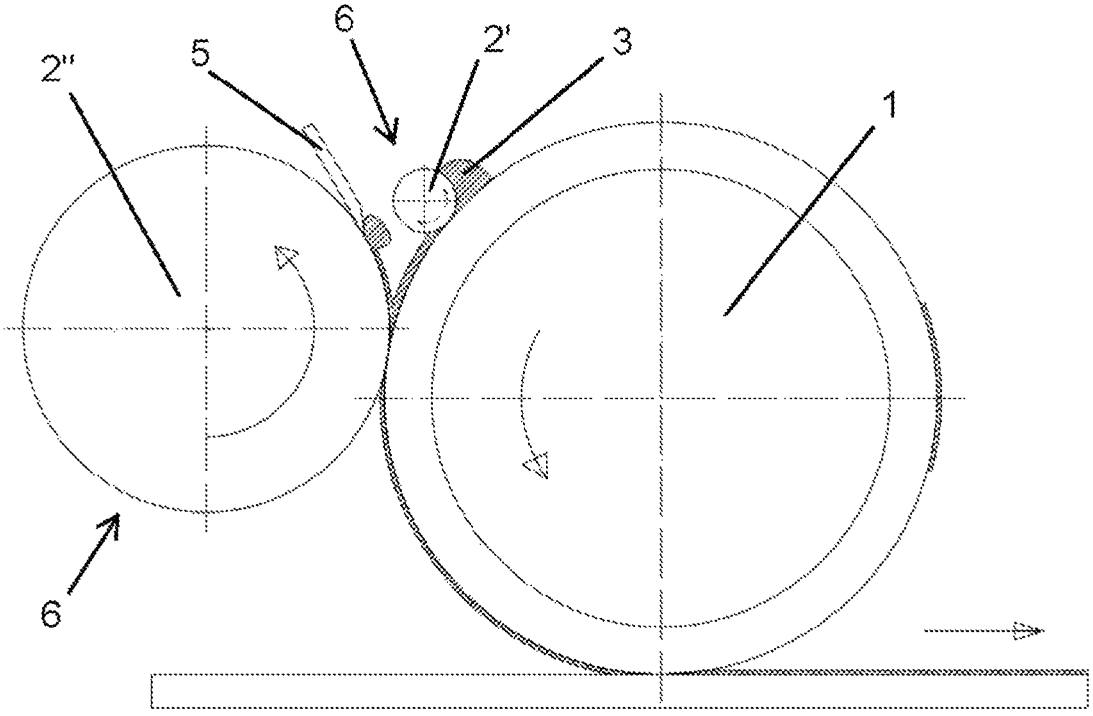
FIG. 4 shows a schematic representation of a third embodiment of the present invention, with a first dosing roller, a second dosing roller, and a blade or spike for scraping product dragged by the second dosing roller.

FIG. 4 shows a third embodiment of the system for applying a product (3) by roller, object of the present invention. In this embodiment, which is simpler than the previous ones, there is a first dosing roller (2') and a second dosing roller (2"). Each dosing roller (2', 2") constitutes, by itself, an independent dosing body (6). There is a spike or blade (5) for scraping the excess product (3) dragged by the second dosing roller (2"), which has not been dosed on the applicator roller (1).

Preferably, each product (3) collection chamber (9'), (9") is closed on the side by means of closing seals or side sealing plates (not shown in the figures) against the very sides of the applicator roller (1), thereby guaranteeing that there is no product (3) lost which comes out of the product (3) collection chambers (9'), (9").

In any of the embodiments, there is a pumping circuit which is directed from a pump towards the first product (3) collection chamber (9') and/or towards the second product (3) collection chamber (9") and/or towards the surface of the applicator roller (1). Neither the pumping circuit nor the pump are represented in the figures.

When the product (3) arrives from the pumping circuit to the first product (3) collection chamber (9') and/or to the second product (3) collection chamber (9") and/or to the surface of the applicator roller (1), the product (3) is dosed by the corresponding dosing roller (2', 2") on the applicator roller (1).

In those embodiments wherein there is at least one product (3) collection chamber (9'), (9"), the first product (3) collection chamber (9') and, if appropriate, the second product (3) collection chamber (9"), comprise valves (not shown in the figures) for the passage of product (3) towards the recirculation circuit (not shown in the figures) which is directed towards the pump and once again towards the pumping circuit. For the opening of the valve of the first chamber (9') and/or of the second chamber (9"), there is a level sensor (not shown in the figures) in each chamber (9'), (9"), such that when a predetermined product (3) level is reached in each of said chambers (9'), (9"), the valve is opened to recirculate the product (3), until the level of product (3) in each of said chambers (9'), (9") falls once again below said predetermined level. In an alternative or complementary manner, the product (3) collection chamber(s) (9'), (9") can have an overflow (not shown) with an overflow opening for the product (3) arranged in a side wall of the corresponding collection chamber (9'), (9").

As shown in FIG. 2, the dosing body (6) can comprise a product (3) collection tray (12). Said collection tray (12) defines, together with at least one side wall (7) of the dosing body (6) and together with the applicator roller (1), a product (3) accumulation compartment (11), for accumulating product (3) dragged by the second dosing roller (2") and/or detached from the applicator roller (1).

The area of the dosing body (6) located in correspondence with the bottom of the product (3) collection tray (12) comprises a drain (not shown in FIG. 2) for removing product (3) towards a waste duct or towards the recirculation circuit. This drain of the collection tray (12) facilitates the cleaning of the accumulation compartment (11).

The product collection tray (12) facilitates the cleaning of the application system by means of a cleaning product supplied to the application system instead of the application product (3). For cleaning, the cleaning product crosses through the first dosing roller (2') and/or the second dosing roller (2"), dragging the excess application product (3) along with the cleaning product to the accumulation compartment (11), wherein said products accumulate and from where they can be removed by means of a drain. The cleaning can be performed by means of the combination of pumping cleaning product with different arrangements of the accumulation compartment (11) and rotations of the dosing rollers (2', 2"). For the cleaning, the rotation of the dosing roller (2") can be performed in the clockwise direction.

According to a possible embodiment, the first product (3) collection chamber (9') comprises an opening (13), defined by at least one side wall (7) of the dosing body (6) and the applicator roller (1). Said opening (13) is wide enough to enable the passage of the product (3) which has not been deposited on the substrate (4) and which returns adhered to the applicator roller (1), once again towards the first product (3) chamber (9').

Figure 5A:
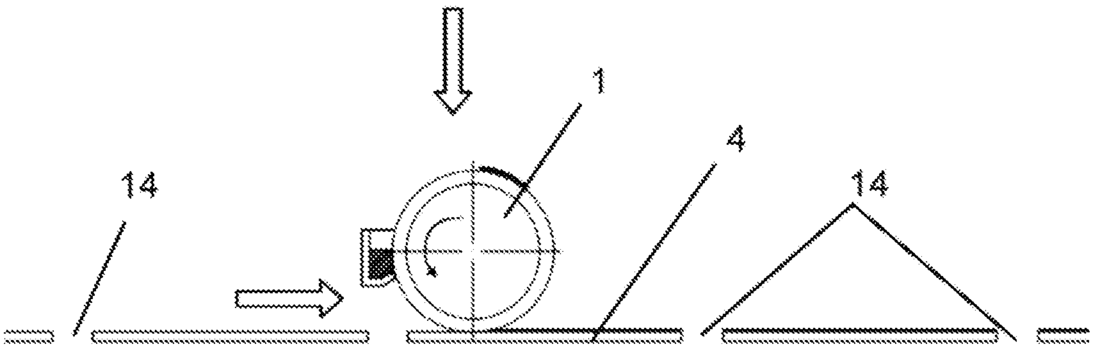
FIG. 5*a* shows a representation of a side view of the application of a product to a series of substrates which run on a conveyor belt.
Figure 5B:
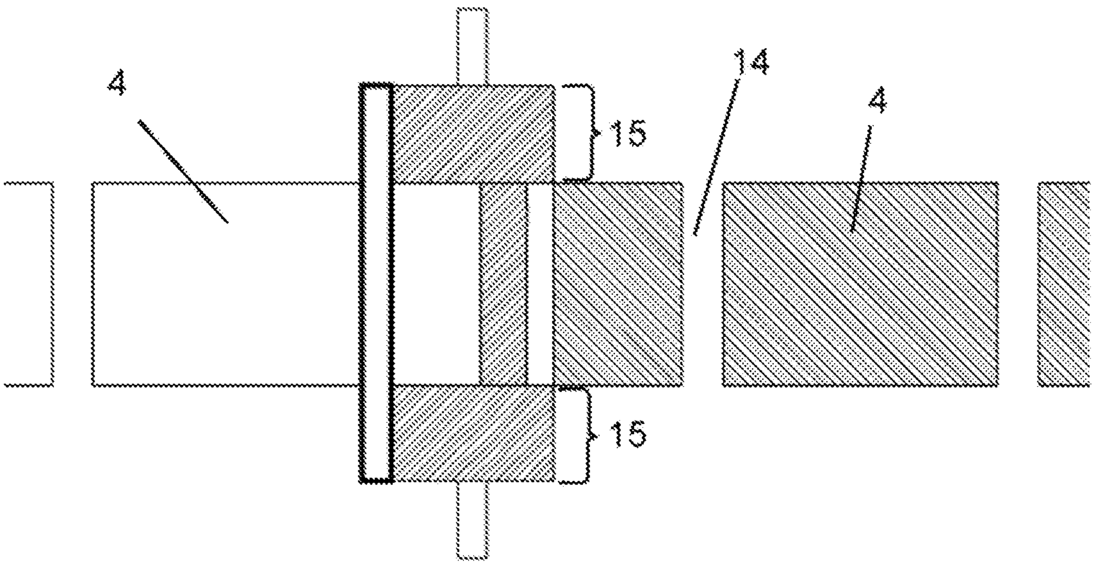
FIG. 5*b* shows a representation of a top view corresponding to FIG. 5*a*.

It is possible that, after applying/dosing the product (3) on the applicator roller (1), said product (3) does not adhere to the substrate (4) (see FIG. 5*a* and FIG. 5*b*), either due to it being applied on an area of the conveyor belt corresponding to an intermediate space (14) between two consecutive substrates (4), or due to it being applied on an area of the conveyor belt corresponding to a side space (15) to the right and/or left of the substrate (4), outside of the substrate (4).

Preferably, the system for applying a product (3) by roller, object of the present invention, comprises a movement subsystem, which enables the first dosing roller (2') and/or the second dosing roller (2") to move closer to and/or farther away from the applicator roller (1). This can be done by moving the dosing body or bodies (6) closer to/farther away from each other respectively towards the applicator roller (1) or in the direction opposite from the applicator roller (1). It can also be achieved by making the dosing body or bodies (6) pivot with respect to the applicator roller (1).

Also preferably, the system for applying a product (3) by roller comprises a motor of the first dosing roller (2') and/or of the second dosing roller (2") which is/are independent from the motor of the applicator roller (1).

By controlling the distance of the first dosing roller (2') and/or of the second dosing roller (2") with respect to the applicator roller (1), the thickness of the layer of product (3) to be dosed on the applicator roller (1) and, therefore, the gram mage of the layer of product (3) to be applied on the substrate (4) can be determined. The greater the distance between the dosing roller (2', 2") and the applicator roller (1), the greater the amount of product (3) dosed.

However, in the first embodiment shown in FIG. 2, if the distance between the first dosing roller (2') and the applicator roller (1) increases above a threshold value, product (3) ceases to be dosed, and the product (3) that could be dragged by the first dosing roller (2') towards the outside of the first chamber (9') falls in the second chamber (9") or in the collection tray (12). Likewise, if the distance between the second dosing roller (2") and the applicator roller (1) increases above a threshold value, product (3) ceases to be dosed, and the product (3) that could be dragged by the second dosing roller (2") towards the inside of the second chamber (9").

Additionally, by controlling the speed of the first dosing roller (2') and/or of the second dosing roller (2"), the amount of product (3) to be dosed on the applicator roller (1) and, therefore, the amount of product (3) to be applied on the substrate (4) can also be controlled.

When the direction of the linear speed of the first dosing roller (2') and/or of the second dosing roller (2") coincides with the direction of the linear speed of the applicator roller (1) in the area wherein said first dosing roller (2') and/or second dosing roller (2") is/are closer to the applicator roller (1) (i.e., when the angular speed(s) of the first dosing roller (2') and/or of the second dosing roller (2") has/have a direction opposite from the angular speed of the applicator roller (1)), the dosing of product (3) on the applicator roller (1) is favoured. In this situation, as already mentioned above, when the magnitude of the speed of the first dosing roller (2') and/or of the second dosing roller (2") increases, the amount of product (3) dosed on the applicator roller (1) increases.

Referring to FIGS. 2 to 4, in order to reduce the amount of product (3) applied, i.e. the grammage thereof, and therefore in order to remove product from the applicator roller (1), the dosing rollers (2', 2") rotate in the counter-clockwise direction. In this manner, the dosing roller (2") provides the additional reduction of the amount of the product (3) applied on the substrate (4) according to the invention.

Also, as shown in FIG. 2, if the product (3) dosed by the second dosing roller (2") is excessive, a portion of the product (3) can fall into the collection tray (12); moreover, it is possible for a portion of the product (3) dosed excessively by the second dosing roller (2") to stay adhered to the second dosing roller (2"). In this case, a retainer (5) located beneath the second dosing roller (2"), and in a position flush with the second dosing roller (2"), scrapes or lifts said excess product (3), causing this excess product (3) to fall into the collection tray (12).

Moreover, when the direction of the linear speed of the first dosing roller (2') and/or of the second dosing roller (2") is opposite from the direction of the linear speed of the applicator roller (1) in the area wherein said first dosing roller (2') and/or second dosing roller (2") is/are closer to the applicator roller (1) (i.e., when the angular speed(s) of the first dosing roller (2') and/or of the second dosing roller (2") has/have the same direction as the angular speed of the applicator roller (1)), the dosing of product (3) on the applicator roller (1) is blocked or hindered. In this situation, as already mentioned above, when the magnitude of the speed of the first dosing roller (2') and/or of the second dosing roller (2") increases, the amount of product (3) dosed on the applicator roller (1) decreases.

According to one advantage of the invention, it is possible to make the dosing rollers (2', 2") of the invention with a reduced diameter with respect to conventional dosing rollers (2), which enables a dosing body (6) having smaller dimensions and a more compact system to be obtained. This reduced size can lead to a reduction in the flexural rigidity of the dosing roller (2'), (2") and of the dosing body (6) as a consequence of the lower inertia of the dosing roller (2'), (2"), which may cause bending or deformations in the dosing roller (2'), (2") which tends to separate the dosing roller (2'), (2") from the applicator roller (1) during the operation of the system when, for example, the dosing roller (2'), (2") is arranged supported on both ends thereof against the dosing body (6). A bending of the dosing roller (2'), (2") would lead to the problem of an incorrect dosing of the product (3).

Figure 6A:
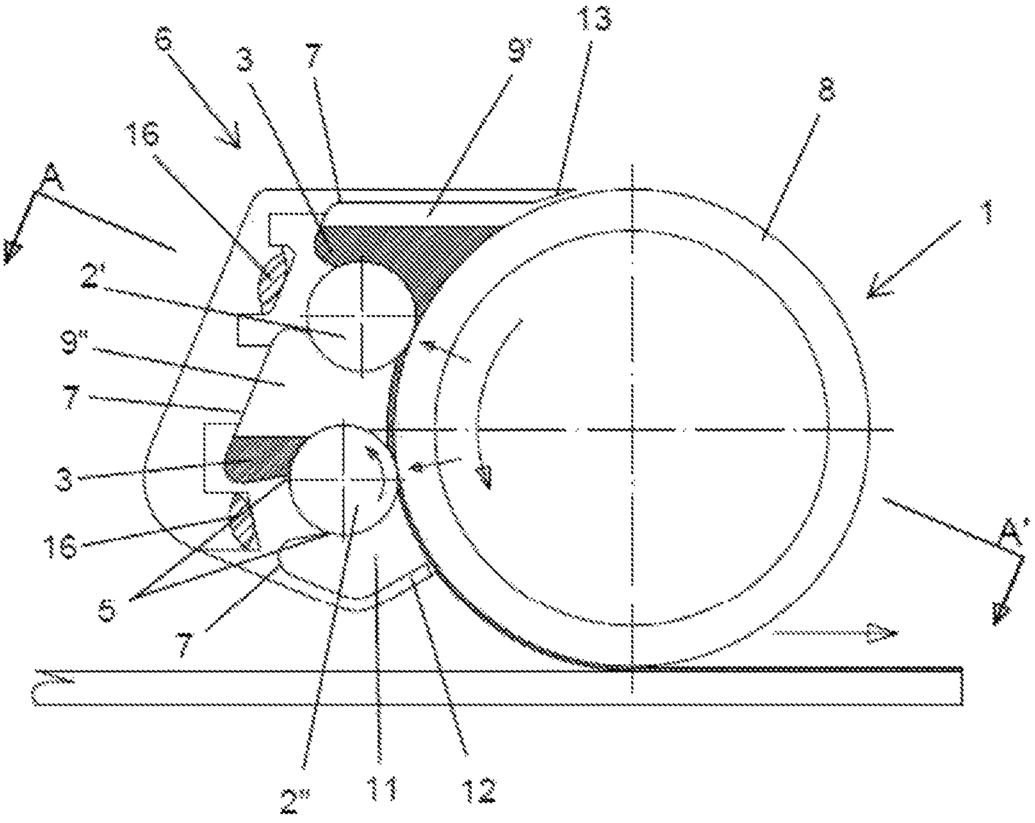
FIG. 6*a* shows a schematic representation of a variant embodiment of the present invention, wherein the dosing body incorporates a support element for the dosing roller.
Figure 6B:
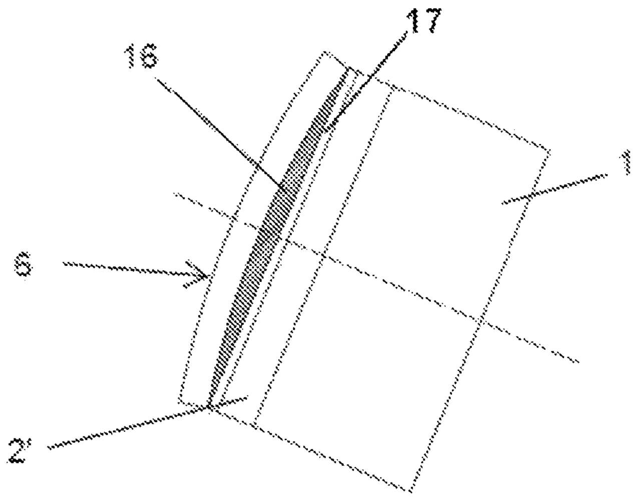
FIG. 6*b* shows the enlarged A-A' cut of the schematic representation of FIG. 6*a* in order to better see the support element.

In order to solve this problem, as seen in FIGS. 6*a* and 6*b*, in an embodiment according to the invention, it is foreseen that the dosing body (6) comprises a support element (16) for the dosing roller (2'), (2"), which extends at least partially along the length of the dosing roller (2'), (2"), enabling the bending or deformation of the dosing roller (2'), (2") against the dosing body (6) to be compensated for. This support element (16) retains the dosing roller (2'), (2") in the dosing position thereof, forcing the contact of the dosing roller (2'), (2") with the applicator roller (1) during the operation of the system. In the variant embodiment shown in FIGS. 6*a* and 6*b*, the support element (16) is formed by an expandable or inflatable rubber, such that when the support element (16) is expanded or inflated, it retains the dosing roller (2'), (2") against the applicator roller (1) during the operation of the system. As shown in FIG. 6*b*, a sliding element (17) can be arranged between the support element (16) and the dosing roller (2'), (2") in order to prevent friction between the support element (16) and the dosing roller (2'), (2").

The invention claimed is:

1. A system for applying a product (3) by roller comprising:

an applicator roller (1) for applying a product (3) on a substrate (4), a first dosing roller (2') for dosing said product (3) on a surface of the applicator roller (1), at least one second dosing roller (2") configured to fine-tune the dosing performed by the first dosing roller (2'), thereby adjusting the amount of product (3) dosed on the surface of the applicator roller (1), and at least one dosing body (6), wherein the at least one dosing body (6) comprises the first dosing roller (2') and/or the at least one second dosing roller (2"), wherein the at least one dosing body (6) comprises one or more side walls (7), wherein the at least one dosing body (6) defines, together with the applicator roller (1), a first product collection chamber (9'), wherein the at least one dosing body (6) or a collection module (10) defines, together with the applicator roller (1) or the second dosing roller (2") respectively, at least one second product collection chamber (9"), wherein the product (3) contained in the first product collection chamber (9') remains in direct contact with the surface of the applicator roller (1) during the application of the product (3), and wherein the first product collection chamber (9') produces a bath on the surface of the applicator roller (1) while the surface of the applicator roller remains in said first product collection chamber (9') where the product (3) is stored.

2. The system for applying a product (3) by roller according to claim 1, further comprising a movement subsystem, which enables the first dosing roller (2') and/or the second dosing roller (2") to move closer to and/or farther away from the applicator roller (1).

3. The system for applying a product (3) by roller according to claim 1, further comprising an independent motor for the applicator roller (1), for the first dosing roller (2') and for the at least one second dosing roller (2").

4. The system for applying a product (3) by roller according to claim 3, further comprising a regulation subsystem for the direction and the rotation speed of the first dosing roller (2') and of the at least one second dosing roller (2").

5. The system for applying a product (3) by roller according to claim 1, further comprising a product (3) recirculation circuit, configured to recirculate the product (3) from the first product collection chamber (9') and/or from the at least one second product collection chamber (9").

6. The system for applying a product (3) by roller according to claim 1, further comprising product (3) level maintenance means in the first product collection chamber (9') and/or in the at least one second product collection chamber (9"), in order to maintain a constant level of product (3) due to the extraction or introduction of product (3) into said first product collection and at least one second product collection chambers (9'), (9").

7. The system for applying a product (3) by roller according to claim 1, wherein the first product collection chamber (9') comprises an opening (13) defined by at least one side wall (7) of the dosing body (6) and by the applicator roller (1), wherein said opening (13) has a width such as to enable a passage towards the first product collection chamber (9') of a layer of product (3) which has not been deposited on the substrate (4) and which returns adhered to the applicator roller (1).

8. The system for applying a product (3) by roller according to claim 1, wherein the at least one dosing body (6) comprises a product collection tray (12) located underneath the first product collection chamber (9') and/or underneath the at least one second product collection chamber (9"), wherein said product collection tray (12) defines, together with the applicator roller (1) and/or together with at least one side wall (7) of the dosing body (6), a product accumulation compartment (11), for accumulating product (3) dragged by the first dosing roller (2') and/or by the second dosing roller (2") and/or detached from the applicator roller (1).

9. The system for applying a product (3) by roller according to claim 1 further comprising at least one retainer (5) configured to retain and/or scrape product (3) dragged by the first dosing roller (2') and/or by the second dosing roller (2").

10. A method for applying a product (3) by roller comprising using the system for applying a product (3) by roller according to claim 1, comprising moving the first dosing roller (2') and/or the at least one second dosing roller (2") closer and/or farther away from the applicator roller (1), in order to reduce and/or increase, respectively, the amount of product (3) to be dosed on the surface of the applicator roller (1).

11. The method for applying a product (3) by roller according to claim 10, further comprising setting an angular speed for the first dosing roller (2') and/or at least one second dosing roller (2"), such that if said angular speed has the same direction as the angular speed of the applicator roller (1), the amount of product (3) dosed on the surface of the applicator roller (1) decreases, and; if said angular speed has the direction inverse to the angular speed of the applicator roller (1), the amount of product (3) dosed on the surface of the applicator roller (1) increases.

* * * * *